(12) United States Patent
Kono

(10) Patent No.: US 8,509,719 B2
(45) Date of Patent: Aug. 13, 2013

(54) RADIO COMMUNICATION TERMINAL AND RECEPTION CONTROL METHOD

(75) Inventor: Kenji Kono, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1051 days.

(21) Appl. No.: 11/444,981

(22) Filed: May 31, 2006

(65) Prior Publication Data

US 2007/0140153 A1 Jun. 21, 2007

(30) Foreign Application Priority Data

May 31, 2005 (JP) ................. P.2005-160516

(51) Int. Cl.
*H04B 1/06* (2006.01)
*H04B 7/00* (2006.01)

(52) U.S. Cl.
USPC ............... 455/231; 455/295; 455/296

(58) Field of Classification Search
USPC ............ 455/231, 230, 269, 295, 296, 334; 370/236, 235, 270
See application file for complete search history.

(56) References Cited

U.S. PATENT DOCUMENTS

| | | | |
|---|---|---|---|
| 5,129,097 A * | 7/1992 | Suzuki et al. | 455/458 |
| 6,256,509 B1 | 7/2001 | Tanaka et al. | |
| 6,757,843 B1 * | 6/2004 | Wesley et al. | 714/18 |
| 6,907,028 B2 | 6/2005 | Laiho et al. | |
| 7,400,625 B2 * | 7/2008 | Rizzo et al. | 370/392 |
| 7,620,061 B2 | 11/2009 | Yi et al. | |
| 2003/0153369 A1 | 8/2003 | Laiho et al. | |
| 2004/0105402 A1 | 6/2004 | Yi et al. | |
| 2005/0157650 A1 | 7/2005 | Laiho et al. | |
| 2005/0246417 A1 * | 11/2005 | Raith et al. | 709/203 |

FOREIGN PATENT DOCUMENTS

| | | |
|---|---|---|
| CN | 1235437 A | 11/1999 |
| CN | 1358035 A | 7/2002 |
| JP | 2004048759 A | 2/2004 |
| JP | 2004-531937 | 10/2004 |
| WO | WO 02/080609 A1 | 10/2002 |
| WO | 03069886 A2 | 8/2003 |
| WO | 2004017540 A1 | 2/2004 |

OTHER PUBLICATIONS

* Japanese Publication No. 2004-531937 corresponds to WO 02/080609 A1.
Chinese language office action and its English language translation for corresponding Chinese application 2006100899906.
Japanese language office action dated May 25, 2010 and its English language translation for corresponding Japanese application 2005160516.

(Continued)

*Primary Examiner* — Christian Hannon
(74) *Attorney, Agent, or Firm* — DLA Piper LLP (US)

(57) ABSTRACT

In a control of receiving service information, a controller in a radio communication terminal (AT) controls a communication section to receive broadcast data continuously for one cycle while a broadcast service is executed. When a packet among the broadcast data can not be received for some reason, retransmission of the packet is awaited. During the waiting period, transfer rates are respectively calculated based on all previously received data and the latest data received (e.g., during the preceding 30 seconds). Then, a time until the required packet is received for the next time is estimated. Until that time, intermittent reception is performed by the radio communication terminal (AT) at an interval assigned for the radio communication terminal.

15 Claims, 6 Drawing Sheets

(56) References Cited

OTHER PUBLICATIONS

Chinese language office action dated Aug. 8, 2008 and its English language translation issued in corresponding Chinese application 200610089990.6 was originally submitted in an IDS on Oct. 17, 2008 in compliance with 37 CFR 1.97(e) is being resubmitted under 37 CFR 1.97(f) in order to provide unintentionally omitted date of issuance.

Chinese language office action dated Aug. 7, 2009 and its English language translation issued in corresponding Chinese application 2006100899906 was originally submitted in an IDS on Sep. 23, 2009 in compliance with 37 CFR 1.97(e) is being resubmitted under 37 CFR 1.97(f) in order to provide unintentionally omitted date of issuance.

\* cited by examiner

BROADCAST DATA AND USER DATA TRANSMISSION SCHEDULE
IN 1xEV-DO COMMUNICATION SYSTEM

* IN CASE WHERE SEQUENCE NUMBER IS UP TO "93"

BROADCAST DATA CYCLIC TRANSMISSION SCHEDULE
IN 1xEV-DO COMMUNICATION SYSTEM

INTERMITTENT RECEPTION

INTERMITTENT RECEPTION IN IDLE STATE OF HYBRID TERMINAL

INTERMITTENT RECEPTION DURING EV-DO COMMUNICATION OF HYBRID TERMINAL

RADIO COMMUNICATION TERMINAL AND RECEPTION CONTROL METHOD

This application claims foreign priority based on Japanese Patent application No. 2005-160516, filed May 31, 2005, the content of which is incorporated herein by reference in its entirety.

BACKGROUND OF THE INVENTION

1. Field of the Invention

The present invention relates to a radio communication terminal and a reception control method that are employed in a radio communication system compatible with a broadcast service and/or a multicast service, for example.

2. Description of the Related Art

1xEV-DO (1x Evolution Data Only) communication system has been commercialized, and one of the system functions is a broadcast multicast service (BCMCS).

In the broadcast services a radio communication network is used, and a base station continuously transmits data in a connectionless form to all radio communication terminals within a service area (for example, a cell or a sector) of the base station. That is, the broadcast service is one form of services of "broadcasting."

The multicast service is similar to the broadcast service. The multicast service is one form of a service in which broadcasting is performed so that only specific users among the radio communication terminals within the service area who have signed up for specified service information (for example, a fee-based service) can receive the data.

FIG. 1 is a diagram showing a broadcast data and user data transmission schedule in the 1xEV-DO communication system. FIG. 2 is a diagram showing a broadcast data cyclic transmission schedule in the 1xEV-DO communication system.

In the broadcast service provided by the 1xEV-DO communication system, unlike a unicast data communication, the base station distributes the same data for all the users requesting for the data (FIG. 1).

At this time, since the terminal can only receive the data but not transmit data, a user who can not receive a part of the data for some reason can not issue a request for retransmission of the data.

However, for such a user, the broadcast data (the data in the broadcast service) is repetitively distributed in a certain cycle (FIG. 2).

Therefore, the user who fails to receive the requested data continues to receive the data in the broadcast service until the requested data is distributed for the next time. During this period, the terminal transmits, at constant intervals, a BCMCS flow registration message indicating that the terminal is keeping on receiving the broadcast service.

Further, since the broadcast data are non-periodically transmitted to the terminal that is performing the broadcast service, as well as during data communication, power needs to be constantly supplied from a power source to a radio circuit (reception circuit), and a radio link (traffic channel, broadcast channel) needs to be constantly monitored. This state is called a continuous reception state.

In addition to the continuous reception state, a terminal at an idle state performs an operation called intermittent reception.

In the intermittent reception operation, the base station periodically transmits required information (for example, notice information and incoming call) to the terminal, at a timing that is determined in advance through negotiation between the terminal side and the base station side. As a result, the terminal halts the supply of power from the power source to the radio circuit until information of which destination is the terminal is received, so as to reduce power consumption (FIG. 3: intermittent reception).

Unlike CDMA2000 1x (Code Division Multiple Access) communication system in which interval of the intermittent reception is always constant, the interval of the intermittent reception in the 1xEV-DO communication system herein differs depending on whether a "PPP (Point to Point Protocol) session" is performed. In the CDMA2000 1x communication system or the 1xEV-DO communication system, since there is a possibility of having an incoming call when the PPP session is performed, the interval of the intermittent reception needs to be shortened.

Presently, the interval of the intermittent reception when the "PPP session" is performed is 5.12 seconds. When the "PPP session" is not performed in the 1xEV-DO communication system, since there is no possibility of having the incoming call, only whether area information of the base station is changed is checked. In this case, compared with the interval of 5.12 second, the intermittent reception interval is actually extended.

The broadcast service in the radio system is disclosed in JP-2004-531937A.

However, the above-described intermittent reception is performed in a radio communication terminal that supports only the 1xEV-DO communication system. In a radio communication terminal that supports both the CDMA2000 1x communication system and the 1xEV-DO communication system, intermittent reception that satisfies both communication systems needs to be performed.

Furthermore, in the radio communication terminal that supports both the CDMA2000 1x communication system and the 1xEV-Do communication system, and further shares a radio communication part in both communication systems (hereinafter, referred to as a hybrid terminal), timings of the intermittent reception in the two systems should not overlap with each other (coincide with each other). Thus, as shown in FIG. 4, the intermittent reception is alternately performed for about 2.5 seconds.

Furthermore, since preference is given to the CDMA2000 1x communication system in the hybrid terminal, as shown in FIG. 5, even during the communication performed by the 1xEV-DO communication system, a control of a radio communication section is shifted to the CDMA2000 1x communication system at the interval of 5.12 seconds.

In order to avoid this situation, a specification, in which a signal message compatible with the CDMA2000 1x communication system is transmitted as a message compatible with the 1xEV-DO communication system so as not to shift the control of the radio communication section to the CDMA2000 1x communication system as much as possible, is included in 1xEV-DO Rev.A. The 1xEV-DO Rev.A is an extended version of the 1xEV-DO communication system.

When this specification is satisfied, it is enough to perform the intermittent reception only in the 1xEV-DO communication system. However, the intermittent reception needs to be performed at the interval of 5.12 seconds, regardless of whether the "PPP session" is performed.

At this time, a tentative calculation of a period of time required for the distribution of data of accumulation type via the broadcast service is performed.

When a data size is 5 Mbyte, and a data rate for broadcast is 75 kbps (transfer rate of physical layer: 614.4 kbps, ratio of real data in the physical layer: 2/3, slot allocated to the broadcast data: 1/6), 5*1024*8/75≡550 seconds. That is, about 10 minutes is required to receive the data for one cycle.

As described above, according to the radio communication terminal in the related art, since the radio link needs to be constantly monitored until the data of which reception is failed in the broadcast service is again received (while waiting for retransmission), there are disadvantages that the power consumption is increased, and battery life is shortened.

SUMMARY OF THE INVENTION

The present invention has been made in view of the above circumstances and has an object to overcome the above problems, and provide a radio communication terminal and a reception control method in which intermittent reception can be performed while waiting for retransmission of service information such as broadcast data, and accordingly, battery life of the terminal can be extended.

In some implementations, a radio communication terminal of the invention comprises: a receiver which receives packets being broadcasted via at least one of a broadcast service and a multicast service; and a controller which, when the receiver fails to receive at least one of the packets, halts reception of the packets until the at least one of the packets is rebroadcasted.

Preferably, in the radio communication terminal of the invention, the controller estimates a time until the failed packet is rebroadcasted based on data of the packets received by the receiver.

Preferably, in the radio communication terminal of the invention, the controller estimates a time until the failed packet is rebroadcasted based on a transfer rate of the packets received by the receiver.

Preferably, in the radio communication terminal of the invention, the controller halts the reception of the packets when the estimated time is equal to or longer than a predetermined period of time.

Preferably, in the radio communication terminal of the invention, while the reception of the packets is halted, the controller controls so that the receiver intermittently receives a control information from a base station.

Preferably, in the radio communication terminal of the invention, the receiver receives the packets at an intermittent reception timing, and the controller estimates a time until the failed packet is rebroadcasted based on the packets received at the timing.

In some implementations, a reception control method of the invention comprises: continuously receiving packets being broadcasted via at least one of a broadcast service and a multicast service; and halting reception of the packets when at least one of the packets that are continuously received is failed to be received, until the at least one of the failed packets is rebroadcasted.

According to the present invention, since the intermittent reception is performed while waiting for the retransmission of the service information such as broadcast data, the battery life of the terminal can be extended.

DESCRIPTION OF THE PREFERRED EMBODIMENTS

The preferred embodiment of the present invention will now be described in correlation with the accompanying drawings.

Figure 1:
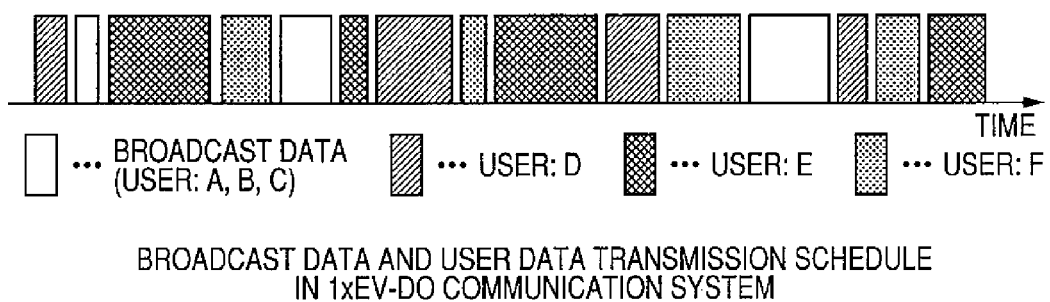
FIG. 1 is a diagram showing a broadcast data and user data transmission schedule according to 1xEV-DO communication system.
Figure 2:
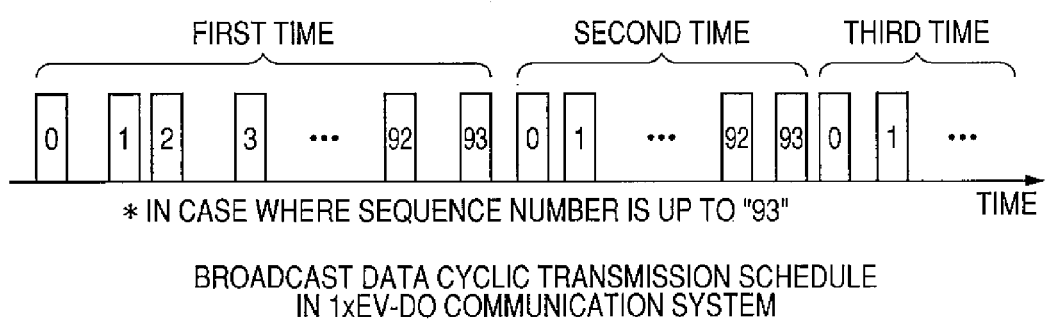
FIG. 2 is a diagram showing a broadcast data cyclic transmission schedule according to the 1xEV-DO communication system.
Figure 3:
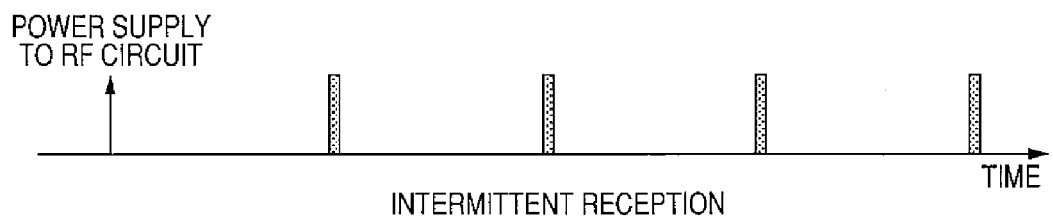
FIG. 3 is a diagram showing normal intermittent reception timings.
Figure 4:
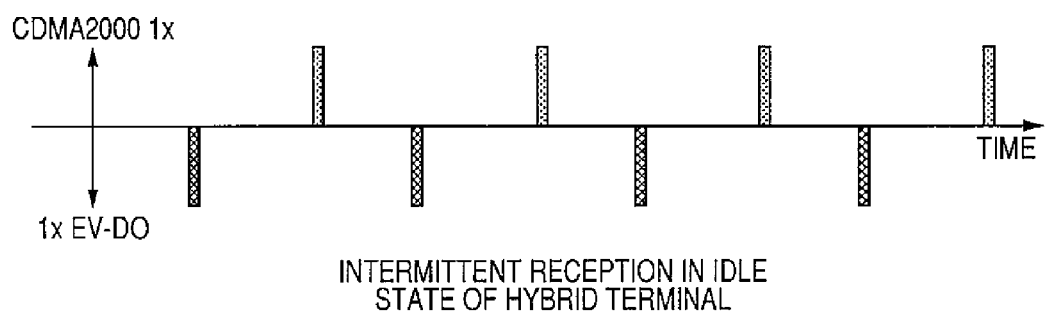
FIG. 4 is a diagram showing intermittent reception timings in an idle state of a hybrid terminal.
Figure 5:
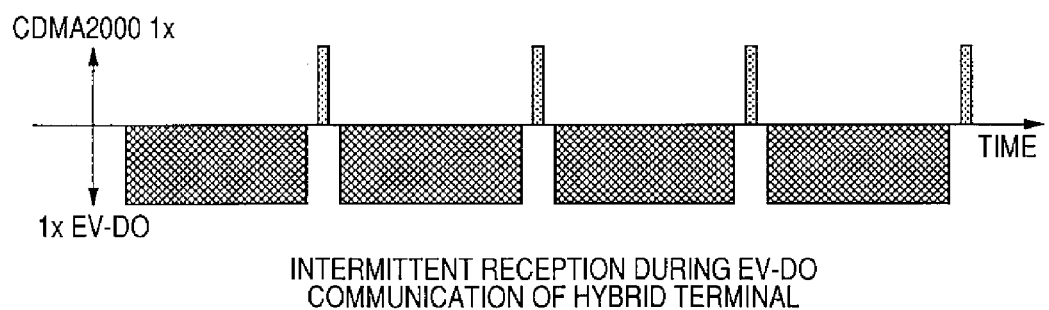
FIG. 5 is a diagram showing intermittent reception timings during EV-DO communication of the hybrid terminal.
Figure 6:
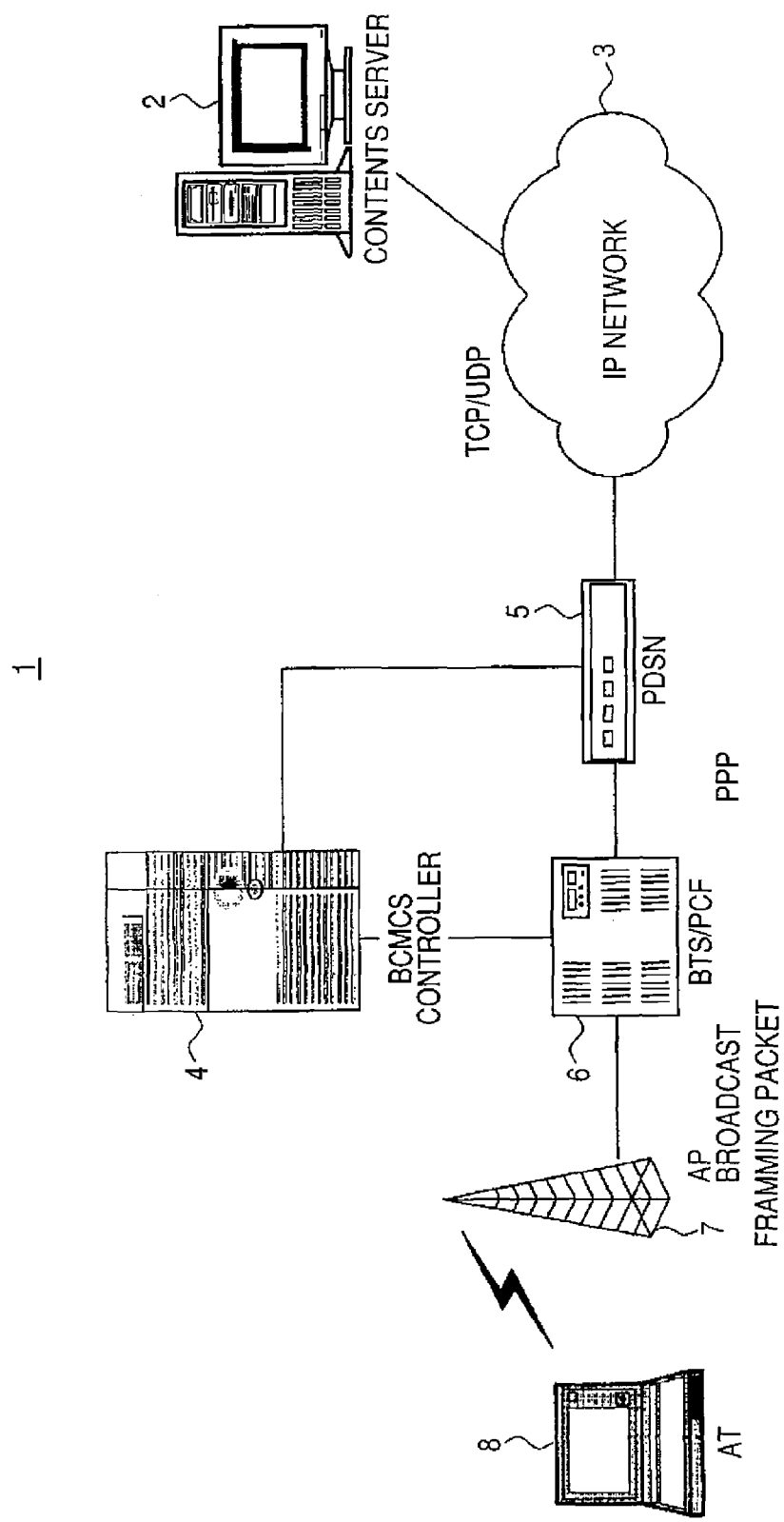
FIG. 6 is a diagram showing a configuration of a radio communication system according to an embodiment of the invention.

FIG. 6 is a diagram showing a configuration of a radio communication system according to an embodiment of the invention.

In the radio communication system 1 in FIG. 6, a contents server 2 is connected via an IP network 3 to a PDSN 5 that is controlled by a broadcast/multicast service (BCMCS) controller 4. The PDSN 5 is connected via BTS/PCF 6 to an access point (AP) 7 that serves as a base station. The PDSN 5 stands for a packet data service node.

The radio communication system 1 and a radio communication terminal (AT: Access Terminal) 8 according to this embodiment are configured so as to be compatible at least with the 1xEV-DO communication system (second communication system), among the CDMA2000 1x communication system (first communication system) which is a code division multiplex type, and the 1xEV-DO communication system (the second communication system) which is a time division multiplex type.

The access point (AP) 7 which serves as the base station employs as a service area a cell (or a sector) that is covered by the base station, and broadcasts (distributes) service information provided by the contents server 2 to all the radio communication terminals (ATs) 8 present in the service area.

Forms of the data broadcasted via the broadcast service or the multicast service include, specifically, character information, audio and music information, video information, and the like, and herein, these data are all called as the service information.

In the BCMCS, between the radio communication terminal (AT) 8 and the access point (AP) 7 as the base station, the radio communication terminal (AT) 8 one-sidedly receives the data broadcasted by the access point (AP) 7.

The radio communication terminal (AT) 8 which is currently receiving the broadcast service receives the broadcast data continuously for one cycle at first. When at least one packet is not received (when reception fails) during the continuous reception for some reason, rebroadcast of that packet is awaited (wait for retransmission).

In this embodiment, during a period in which the rebroadcast of the packet is awaited (wait for the retransmission), transfer rates are respectively calculated based on all the data previously received and the latest data received (e.g., during the last thirty seconds), and a time until the required packet is broadcasted for the next time is estimated. Until that time, the radio communication terminal (AT) 8 halts (interrupts, stops) the continuous reception for receiving the broadcast data, and intermittently receives control information from the access point (AP) 7 as the base station at an interval assigned for the radio communication terminal 8.

While this intermittent reception process is performed to monitor the control information of the access point (AP) 7 as the base station, the radio communication terminal (AT) 8 receives the broadcast data that are non-periodically broadcasted when confirming communication state, and corrects the time until the required packet is rebroadcasted.

At this time, when it is determined that a BCMCS flow registration message needs to be transmitted before the next timing of the intermittent reception, the BCMCS flow registration message is transmitted in advance. When the transmission of this message is not required for the system, this process may be eliminated.

The radio communication terminal (AT) 8 in this embodiment will now be explained.

Figures 7, 8:
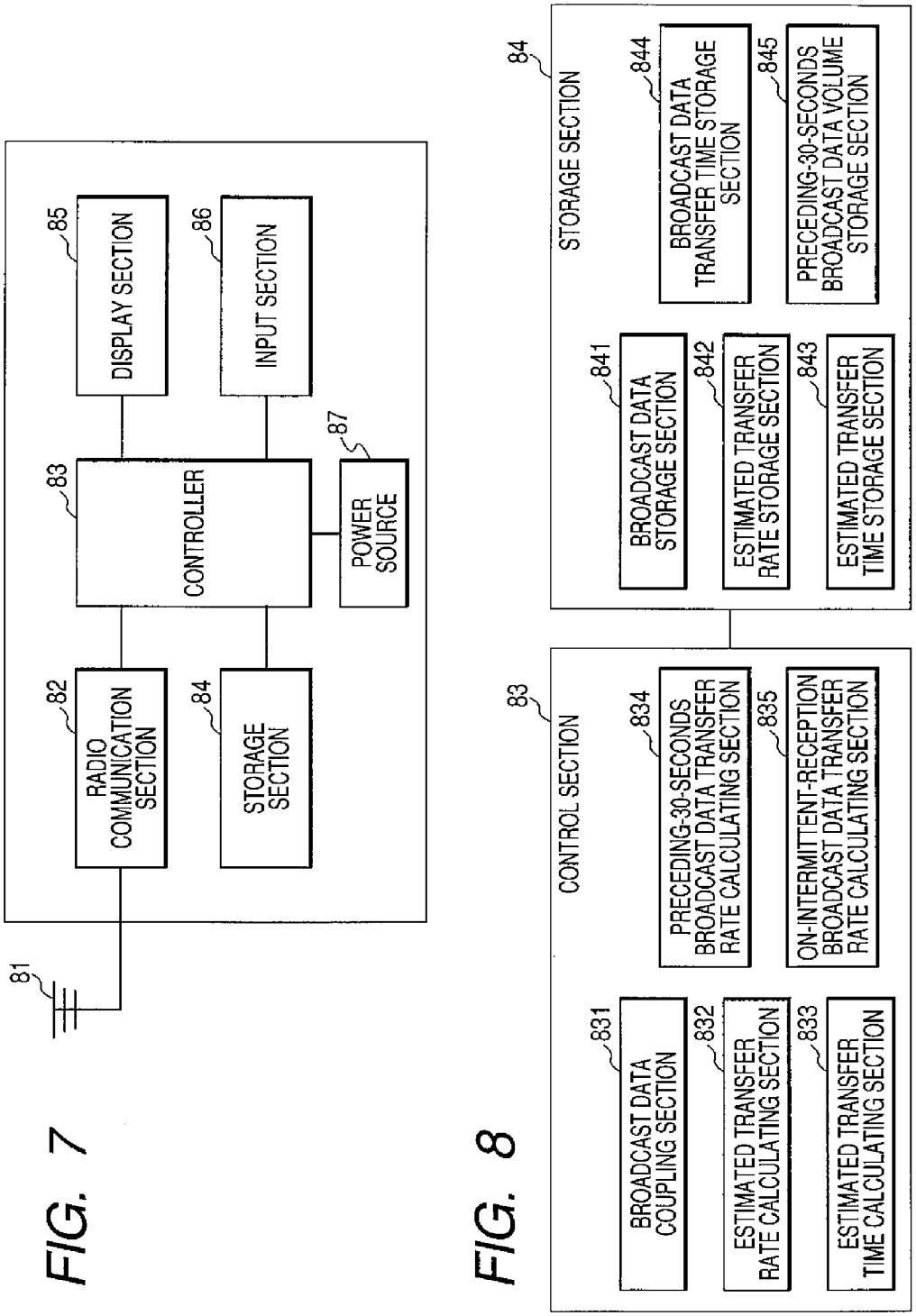
FIG. 7 is a block diagram showing a configuration of a radio communication terminal (AT) 8 according to an embodiment of the invention.
FIG. 8 is a functional block diagram showing a controller and a storage section of the radio communication terminal (AT) 8 according to an embodiment of the invention.

FIG. 7 is a block diagram showing a configuration of the radio communication terminal (AT) 8 of this embodiment.

FIG. 8 is a functional block diagram showing a controller and a storage section of the radio communication terminal (AT) 8 of this embodiment.

The radio communication terminal (AT) 8 not only performs normal audio communication and data communication, but also performs reception of the BCMCS. The radio communication terminal (AT) 8 includes, as its main components, an antenna 81, a radio communication section 82 having an RF circuit, a controller 83, a storage section 84, a display section 85 and an input section 86.

The antenna 81 is connected to the radio communication section 82, receives radio waves transmitted from the access point (AP) 7 as the base station, and transmits radio waves to the access point (AP) 7.

The radio communication section 82 demodulates a high frequency signal received at the antenna 81 to obtain a digital signal, and modulates, under the control of the controller 83, a digital signal to be transmitted so as to transmit the digital signal to the antenna 81.

The controller 83 executes a program stored in the storage section 84 so as to control operations of audio communication and data communication and perform processes of various services that employ radio communication. The controller 83, for example, controls the reception of the service information related to the broadcast service, controls a switching (a handoff) of the access point (AP), or the like.

In the control of the reception of the service information, the controller 83 controls the radio communication section 82 so as to continuously receive the broadcast data for one cycle, while the broadcast service is being provided. When at least one packet among the broadcast data can not be received due to some reason, rebroadcast of this packet is awaited.

While the controller 83 awaits the rebroadcast (the retransmission), the controller 83 calculates the transfer rates respectively based on all the data previously received and the latest data received (e.g., within the last thirty seconds), and estimates the time until the packet is rebroadcasted. Until that time, the radio communication terminal (AT) 8 halts (interrupts, stops) the continuous reception of the broadcast data for receiving the broadcast data, and performs the intermittent reception at the interval assigned for the terminal 8.

The controller 83 receives the broadcast data that are non-periodically transmitted when confirming the communication state during the intermittent reception, and again corrects the time until the requesting packet is rebroadcasted. At this time, when the controller 83 determines that the BCMCS flow registration message needs to be transmitted before the next intermittent reception timing, the controller 83 controls the radio communication section 82 so as to transmit the BCMCS flow registration message in advance. When the message is not required, which depends on the system, this process may be eliminated.

In order to provide this processing, the controller 83 includes, as shown in FIG. 8, a broadcast data coupling section 831, an estimated transfer rate calculating section 832, an estimated transmission time calculating section 833, a preceding-30-seconds broadcast data transfer rate calculating section 834 and an on-intermittent-reception broadcast data transfer rate calculating section 835.

The controller 83 controls a supply of power from a power source 87 to the radio communication section 82. Specifically, during the continuous reception state, the controller 83 continues to permit the power source 87 to supply power to the radio communication section 82. In the intermittent reception state, the controller 83 controls the supply of power to the radio communication section 82 intermittently in accordance with the period established for the data reception.

The storage section 84 stores information required for the operations of the radio communication terminal (AT) 8, and a control program. For example, the service information currently received by the radio communication terminal (AT) 8, information obtained and processed by the controller 83 upon receiving the service information, and peripheral base station information received from the access point (AP) 7 which serves as the base station, are stored in the storage section 84.

In order to store the information obtained by the controller 83 through the reception of the broadcast data, which is the service information, the storage section 84 includes, as shown in FIG. 8, a broadcast data storage section 841, an estimated transfer rate storage section 842, an estimated transfer time storage section 843, a broadcast data transfer time storage section 844 and a preceding-30-seconds broadcast data volume storage section 845.

The display section 85 is controlled by the controller 83, and includes: a display panel, such as an LCD (liquid crystal display), on which character information, image information, operating states (electric field intensity, remaining amount of battery power, time, and the like) of the radio communication terminal (AT) 8, and the like are displayed; and a backlight for illuminating the display panel.

The input section 86 accepts inputs of characters and numbers, and instructions of operations to the radio communication terminal (AT) 8, and the like.

Specific processing procedure performed in this embodiment for receiving the broadcast data will now be described in correlation with the flowchart in FIG. 9.

The radio communication terminal (AT) 8 which receives the broadcast data via the 1xEV-DO communication system, for example, continuously receives the broadcast data for one cycle (ST1) at first.

When the reception of the data for one cycle is completed (ST2), a check is performed to determine whether a packet failed in the reception (missing packet) exists (ST3).

When the packet failed in the reception exists, a data transfer rate V(T) for one cycle and a data transfer rate V($\alpha$) for the latest received time $\alpha$ (e.g., thirty seconds) are calculated, and a higher rate is regarded as the estimated transfer rate V (ST4 to ST6).

Based on the estimated transfer rate V and the current sequence number, an estimated time Tn up to the sequence number of the packet that is failed in the reception last time (missing packet) and that is to be rebroadcasted is calculated (ST7).

When the estimated time Tn up to the time in which the missing packet is to be rebroadcasted is equal to or longer than a certain period of time (a predetermined period of time) β (e.g., three seconds), the intermittent reception is performed until a time left becomes less than the period of time β. However, when the estimated time Tn is shorter than the period of time β, the reception is performed continuously (ST8 to ST10 and ST21).

When the time for monitoring the control information of the access point (AP) 7 as the base station of the intermittent reception is reached (ST11), normally the terminal 8 enters a sleep mode (a state in which the supply of power to the radio communication section 82 is halted) after a quick config message is received. In this embodiment, however, the continuous reception is performed so as to receive the broadcast data (ST12).

Then, the current sequence number is obtained from the received broadcast data, and is compared with an estimated sequence number which is estimated based on the estimated transfer rate V (ST14).

When a difference between the two sequence numbers is smaller than γ (e.g., 10), the process in the terminal 8 performs the intermittent reception. Whereas when the difference is equal to or greater than γ, the following re-calculation is performed.

A new transfer rate V(S) is again calculated based on the time obtained from the previously received broadcast data (which is received last time) and the currently received broadcast data (ST15).

Then, the estimated transfer rate V and the new transfer rate V(S) are compared, and the a higher transfer rate is regarded as the estimated transfer rate V (ST16).

Next, the estimated time Tn is re-calculated based on the estimated transfer rate V and the current sequence number (ST17).

When it is determined that the BCMCS flow registration message needs to be transmitted before the next intermittent reception timing, the BCMCS flow registration message is transmitted in advance (ST18 and ST19). However, depending on the system, when the transmission of the BCMCS flow registration message is not necessary, this process may be eliminated.

Then, the above described processing is repeated until the estimated time Tn up to the time in which the missing packet is rebroadcasted becomes shorter than (falls within) the period of time β (ST11 to ST19).

When the estimated time Tn becomes shorter than the period of time β, the terminal 8 performs the continuous reception operation (ST21). Thereafter, the processes from steps ST7 to ST22 are repeated until the broadcast data is completely obtained.

The values used in the above explanation are merely examples, and other values may be employed.

Figure 10:
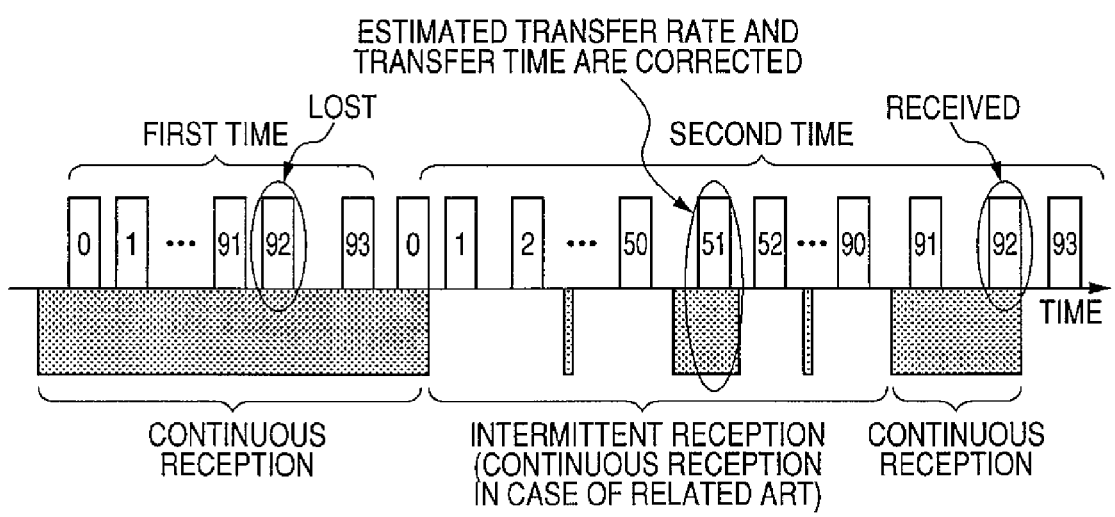
FIG. 10 is a diagram for explaining effects provided in an embodiment of the invention.

FIG. 10 is a diagram for explaining effects provided in this embodiment.

Figure 9:
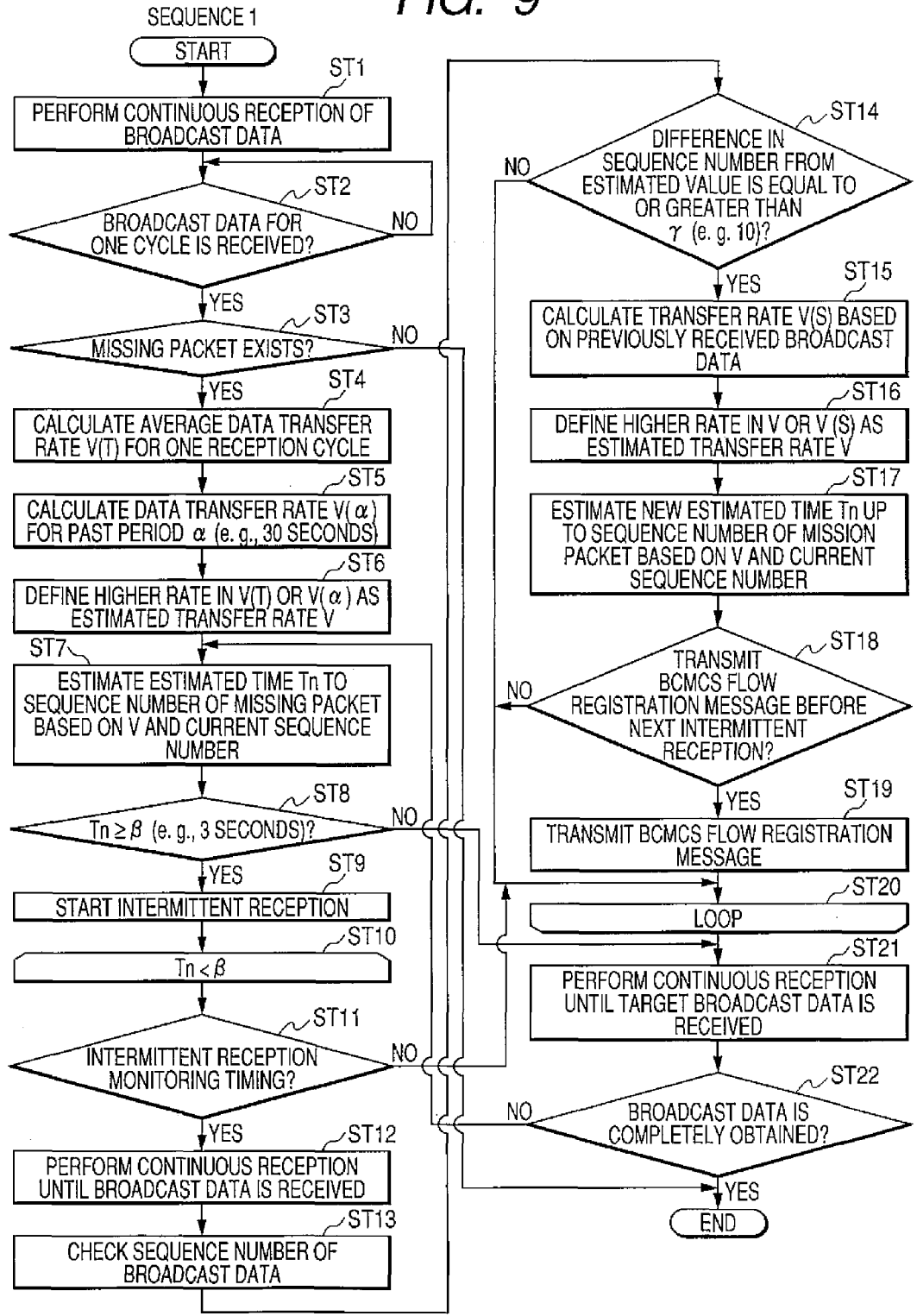
FIG. 9 is a flowchart for explaining an operation in an embodiment of the invention.

In this embodiment, as shown in FIG. 9, the intermittent reception is performed in the periods in which the continuous reception is performed in the related art.

During the intermittent reception, the broadcast data having a sequence number 51 is received, and the estimated transfer rate and the estimated time are corrected. When, during in this continuous reception state, the BCMCS flow registration message needs to be transmitted before the next intermittent reception, this message is transmitted in advance.

When the estimated time becomes shorter than the predetermined period of time, the state is returned to the continuous reception state, and target broadcast data is awaited.

Therefore, the intermittent reception can be performed while the rebroadcast (retransmission) of the service information such as the broadcast data is awaited, and accordingly, the life of the battery of the terminal can be extended, which is an advantage.

The present invention is not limited to this embodiment, and the radio communication terminal of the invention includes apparatuses such as a mobile phone, a radio communication card and a radio communication module, having radio communication functions.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A radio communication terminal comprising:
a receiver which receives packets being broadcasted via at least one of a broadcast service and a multicast service; and
a controller which, when the receiver fails to receive at least one of the packets, halts continuous reception of the packets until said at least one of the failed packets is rebroadcasted,
wherein the controller monitors a control information of the base station while waiting for the rebroadcast,
wherein the rebroadcast is not requested by the radio communication terminal,
wherein the packets are repetitively broadcasted in a certain cycle.

2. The radio communication terminal according to claim 1, wherein the controller estimates a time until the failed packet is rebroadcasted based on data of the packets received by the receiver.

3. The radio communication terminal according to claim 1, wherein the controller estimates a time until the failed packet is rebroadcasted based on a transfer rate of the packets received by the receiver.

4. The radio communication terminal according to claim 2, wherein the controller halts the reception of the packets when the estimated time is equal to or longer than a predetermined period of time.

5. The radio communication terminal according to claim 3, wherein the controller halts the reception of the packets when the estimated time is equal to or longer than a predetermined period of time.

6. The radio communication terminal according to claim 1, wherein while the reception of the packets is halted, the controller controls so that the receiver intermittently receives the control information from a base station.

7. The radio communication terminal according to claim 6, wherein
the receiver receives the packets at an intermittent reception timing, and
the controller estimates a time until the failed packet is rebroadcasted based on the packets received at the timing.

8. A reception control method comprising:
continuously receiving packets being broadcasted via at least one of a broadcast service and a multicast service;
halting continuous reception of the packets when at least one of the packets that are continuously received is failed to be received, until said at least one of the failed packets is rebroadcasted; and monitoring a control information of the base station while waiting for the rebroadcast, wherein the rebroadcast is not requested by the radio communication terminal, wherein the packets are repetitively broadcasted in a certain cycle.

9. The reception control method according to claim 8, further comprising:

estimating a time until the failed packet is rebroadcasted based on data of the packets that are continuously received.

10. The reception control method according to claim 8, further comprising:

estimating a time until the failed packet is rebroadcasted based on a transfer rate of the packets that are continuously received.

11. The reception control method according to claim 9, wherein the reception of the packets is halted when the estimated time is equal to or longer than a predetermined period of time.

12. The reception control method according to claim 10, wherein the reception of the packets is halted when the estimated time is equal to or longer than a predetermined period of time.

13. The reception control method according to claim 8, further comprising:

receiving the control information from a base station intermittently while the reception of the packets is halted.

14. The reception control method according to claim 13, further comprising:

receiving the packets at an intermittent reception timing; and estimating a time until the failed packet is rebroadcasted based on the packets received at the timing.

15. A radio communication terminal comprising:

a receiver which receives a series of packets being broadcasted via at least one of a broadcast service and a multicast service, wherein the series of packets is broadcasted a plurality of times; and a controller which, when the receiver fails to receive at least one packet in receiving the series of packets, halts reception of the series of packets, which is rebroadcasted, until said at least one packet is rebroadcasted, wherein the controller monitors a control information of the base station while waiting for the rebroadcast, wherein the rebroadcast is not requested by the radio communication terminal, wherein the packets are repetitively broadcasted in a certain cycle.

\* \* \* \* \*